United States Patent [19]

Nakamura

[11] Patent Number: 4,819,071
[45] Date of Patent: Apr. 4, 1989

[54] SOLID STATE IMAGING APPARATUS

[75] Inventor: Tsutomu Nakamura, Ina, Japan

[73] Assignee: Olympus Optical Co., Ltd., Tokyo, Japan

[21] Appl. No.: 172,813

[22] Filed: Mar. 25, 1988

[30] Foreign Application Priority Data

Apr. 17, 1987 [JP] Japan .................................. 62-93128

[51] Int. Cl.$^4$ ......................... H04N 3/14; H01L 27/14
[52] U.S. Cl. ............................ 358/213.16; 358/213.12; 358/213.31; 357/30
[58] Field of Search ...................... 358/212.11, 213.12, 358/213.16, 213.26, 213.27, 213.31, 212; 357/30 G, 30 H, 30 Q, 24 LR

[56] References Cited

U.S. PATENT DOCUMENTS

| | | | |
|---|---|---|---|
| 4,363,963 | 12/1982 | Ando | 358/212 |
| 4,407,010 | 9/1983 | Baji et al. | 357/30 H |
| 4,518,863 | 5/1985 | Fukuoka et al. | 358/213.12 |
| 4,571,624 | 2/1986 | Nishizawa et al. | 358/213.12 |
| 4,587,562 | 5/1986 | Imai et al. | 358/213.12 |
| 4,678,938 | 7/1987 | Nakamura | 358/213.12 |
| 4,728,802 | 3/1988 | Baron | 358/213.11 |

FOREIGN PATENT DOCUMENTS 3513436 10/1985 Fed. Rep. of Germany ........................ 358/213.12

*Primary Examiner*—Jin F. Ng
*Assistant Examiner*—Stephen Brinich
*Attorney, Agent, or Firm*—Armstrong, Nikaido Marmelstein & Kubovcik

[57] ABSTRACT

A solid state imaging apparatus includes an internal amplification type of light-receiving element which constitutes a picture element, a signal processing circuit incorporating a pre-amplifier for processing a video signal current of the light-receiving element constituting a picture element, an internal amplification type of reference light-receiving element which is shielded from light illumination, a feedback loop provided in the pre-amplifier for controlling the gate voltage of the reference light-receiving element such that a current having the same value as that of the video signal current of the light-receiving element constituting a picture element is caused to flow to the reference light-receiving element, and means for discharging the dark current charge accumulated in the reference light-receiving element in the period during which the video signal current from the light-receiving element constituting the picture element is suspended.

Therefore, the reference light-receiving element functions as a negative feedback element of the pre-amplifier, by means of which the gate voltage of the reference light-receiving element is varied such that a source current which is equivalent to that of the light-receiving element constituting a picture element is caused to flow therethrough under the same bias conditions as in the case of the light-receiving element constituting a picture element, enabling an output which is linear to the quantity of light which is received to be produced as the output of the pre-amplifier.

21 Claims, 12 Drawing Sheets

FIG. IA
PRIOR ART
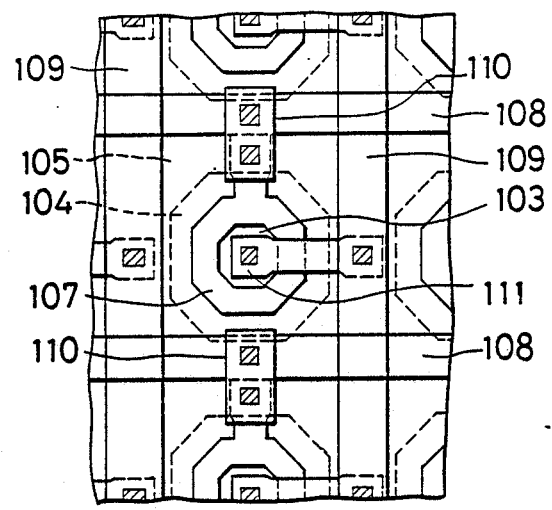
FIG. IB
PRIOR ART
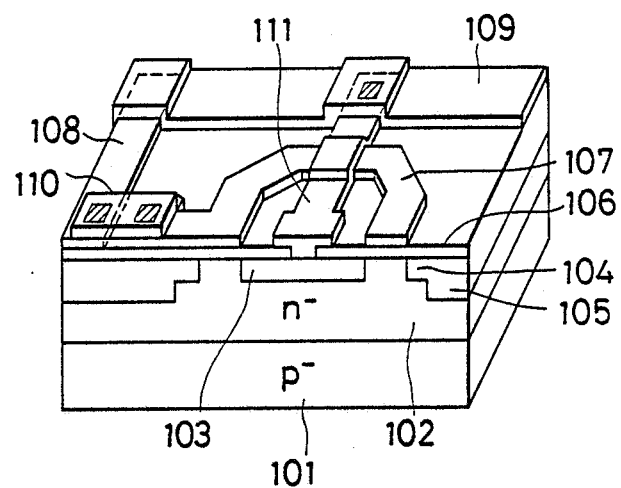

SOLID STATE IMAGING APPARATUS

BACKGROUND OF THE INVENTION

1. Field of the Invention

The present invention relates to a solid state imaging apparatus employing a light-receiving element which is internally amplified and in which channel current is controlled by variations in the potential which is caused by the charges accumulated as a result of light illumination. More particularly, the present invention pertains to an improvement in a signal outputting circuit for a solid state imaging apparatus of this type.

2. Description of the Prior Art

Solid state imaging apparatuses which employ as an internal amplification type light-receiving element a certain type of element known as charge modulation device have been proposed in, for example, the specification of Japanese Patent Laid-Open No. 84059/1986 filed by the present applicant.

FIGS. 1A and 1B are respectively plan and perspective views of an example of the structure of such a solid state imaging apparatus which employs charge modulation devices as the picture elements. As can be seen from the drawings, the apparatus includes a p− substrate 101 made of a silicon, a channel layer 102 which is an n− epitaxial layer formed on the substrate 101, a source region 103 which is an N+ diffused layer, a shallow drain region 104 which is an n+ diffused layer, a deep drain region 105 which is an n+ diffused layer and which functions as an isolation region, an insulating film 106, a gate electrode 107 formed in such a manner as to surround the source region 103, a common gate line 108, a common source line 109, a wiring 110 which is a metal thin film for connecting each of the gate electrodes 107 and the gate line 108, and a source electrode 111. The source region 103, the gate electrode 107, and the shallow and deep drain regions 104 and 105 are disposed in a concentric manner as viewed from above and in combination form a light-receiving element which constitutes a picture element. The common gate line 108 serves to connect the gate electrodes 107 of the individual picture elements in a horizontal direction. The common source line 109 is adapted to connect the source regions 103 in a vertical direction.

Such a light-receiving element operates as a bulk channel MOS transistor when it receives light and a signal is accordingly read out: the holes generated as a result of light illumination are accumulated immediately below the gate electrode 107 so as to form an inversion layer. While no inversion layer is being formed, a potential barrier is formed in the bulk channel by the negative potential applied to the gate electrode 107, so no electron current flows from the source region 103 to the drain regions 104 and 105. On the other hand, the inversion layer which is formed by the light illumination reduces the height of the potential barrier formed in the bulk channel, causing the electron current which has been modulated in accordance with the number of holes in the inversion layer to flow.

In consequence, if the gate line 108 is connected to a vertical scanning circuit with the source line 109 being connected to a horizontal scanning circuit through a MOS type selection switch, the source current of the picture element in the row selected by the horizontal scanning circuit from among the picture elements connected to the gate line selected by the vertical scanning circuit is made to flow through a video line to a load so as to enable the intensity of light which is incident to be detected as a variation in the voltage.

In the solid state imaging apparatus of the above-described type, since the signal current from each of the light-receiving elements is read out through the corresponding MOS type selection switch opened and closed by the horizontal scanning circuit to the video line which has a relatively large parasitic capacity (about 1 pF to 100 pF), an amplifier which can detect current at a low impedance is required as a signal detection amplifier.

To deal with this situation, therefore, it is known to convert a signal current $I_s$ to a voltage in the manner expressed by equation (1) below by conducting a negative feedback on an operational amplififer 206 by an impedance 207 ($Z_f$), as shown in FIG. 2.

$$V_0 = -Z_f I_s \tag{1}$$

In FIG. 2, a reference numeral 201 denotes a solid state imaging apparatus employing a charge modulation device; 202 denotes a light-receiving element; 203 denotes a MOS type selection switch; 204 denotes a video line; and 205 denotes a video line parasitic capacity.

However, the solid state imaging apparatus which employs as the picture elements the internal amplification type light-receiving elements of the above-described type has the following disadvantages: firstly, the quantity $P_{IN}$ of light which is illuminated to the internal amplification type light-receiving element and the gate potential variation $V_{PH}$ caused by the charges generated as the result of light illumination have a proportional relationship as follows:

$$V_{PH} \propto P_{IN} \tag{2}$$

On the other hand, the gate potential variation $V_{PH}$ and the resultant signal current I have a non-linear relationship, as shown in equation (3).

$$I = f(V_{PH}) \tag{3}$$

Therefore, the signal current I must be converted to a signal which is proportional to the quantity of light which is illuminated $P_{IN}$ in a subsequent signal processing system, so a complicated circuit is required for accurate conversion to take place. Furthermore, in the internal amplification type light-receiving element, variations in the gate potential often cause variations in the signal current which are larger than those obtained when these factors are proportional to each other, thus requiring a subsequent signal processing system which has an extremely wide dynamic range.

This is explained with reference to FIG. 3. In a solid state imaging apparatus which employs internal amplification type light-receiving elements whose gate potential variation $V_{PH}$ and the resultant signal current I have a relationship such as that expressed by the equation (4) below, $$I \propto (V_{PH})^\gamma; \gamma = 2.0 \tag{4}$$

if the light illumination requires a dynamic range of 40 dB, a dynamic range of 80 dB is required for the detection system of the signal current I, making practical use of a solid state imaging apparatus which employs internal amplification type light-receiving elements difficult.

When the signal current I is to be linearly processed in the subsequent circuit, since the non-linearity thereof consists in the operational characteristics of the light-receiving element, as shown in the equation (3), an inverted conversion conducted by a circuit which employs a known element may cause errors. Further, it is very difficult to perform inverted correction of variations in the temperature caused by the non-linearity expressed by the equation (3).

SUMMARY OF THE INVENTION

The present invention is directed to overcoming the above-described problems of the known solid state imaging apparatus which employs an internal amplification type light-receiving element, and its object is to provide a solid state imaging apparatus employing an internal amplification type light-receiving element which incorporates a signal processing circuit which is capable of producing a linear output expressed by equation (5) with respect to the quantity of light which is received, i.e., variations in the gate potential, $$V_{OUT} \propto V_{PH} \quad (5)$$

and which ensures that the temperature characteristics contained in the current voltage characteristics expressed by equation (3) are compensated for in this output.

To this end, the present invention provides a solid state imaging apparatus in which a signal current from an internal amplification type light-receiving element is read out to a signal processing circuit incorporating a pre-amplifier and which is characterized in that it incorporates an internal amplification type reference light-receiving element which is shielded from light, that the pre-amplifier has a feedback loop for controlling the gate voltage of the reference light-receiving element such that a current having the same value as that of the signal current is caused to flow to the reference light-receiving element, and that a means is provided for discharging the dark current charges accumulated in the reference light-receiving element in the period during which a video signal is suspended.

With the above-described arrangement, the reference light-receiving element which is shielded from light functions as a negative feedback element of the pre-amplifier, by means of which the gate voltage of the reference light-receiving element is varied such that a source current equivalent to that of the light-receiving element is caused to flow therethrough under the same biasing conditions so as to produce as the output of the pre-amplifier an output which is linear with respect to the quantity of light which has been received. Further, since the source current is inversely converted to the gate voltage using the reference light-receiving element which has the same structure as the light-receiving element and which is shielded from light, the temperature characteristics in the output which are caused by the characteristics of variations in the channel current with respect to variations in the gate potential of the light-receiving element can be compensated for, enabling this output to be processed by a normal video signal processing system without any further modification.

BRIEF DESCRIPTION OF THE DRAWINGS

FIG. 1A shows the structure of a known solid state imaging apparatus which employ a charge modulation device light-receiving element as viewed from above;

FIG. 1B is a cross-sectional perspective view of the solid state imaging apparatus of FIG. 1A;

FIG. 10 shows the principle on which another example of a means for discharging dark current charges is based on;

DETAILED DESCRIPTION OF THE PRESENT INVENTION

Figure 2:
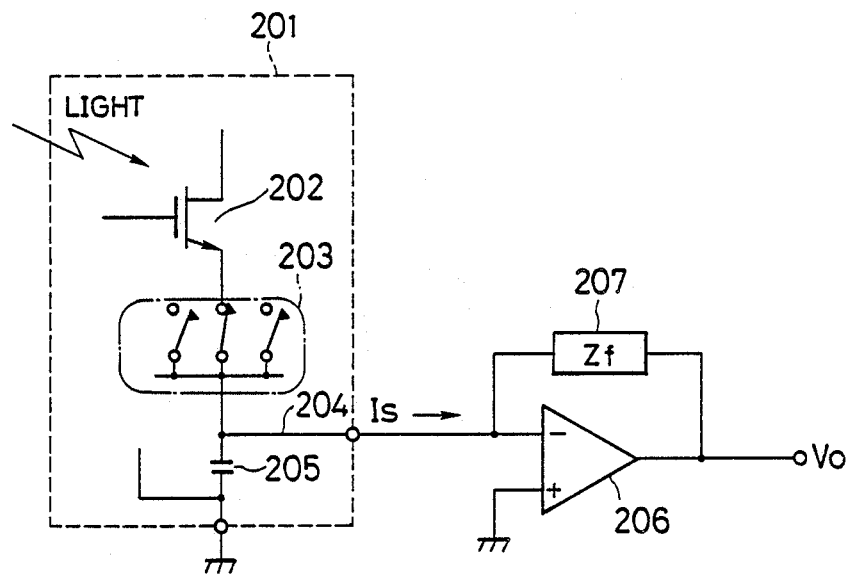
FIG. 2 is a circuit diagram of an example of a known solid state imaging apparatus which employs an internal amplification type light-receiving element.
Figure 3:
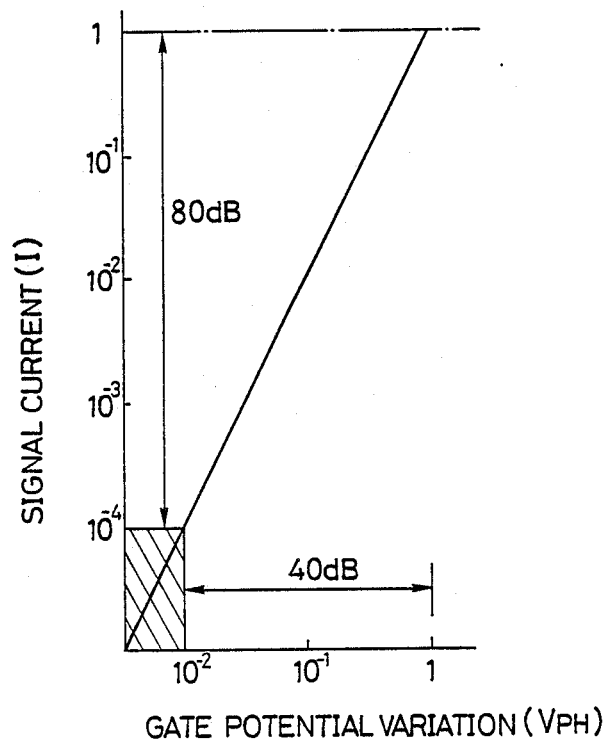
FIG. 3 shows variations in the signal current of the internal amplification type light-receiving element with respect to variations in the gate potential.
Figure 4:
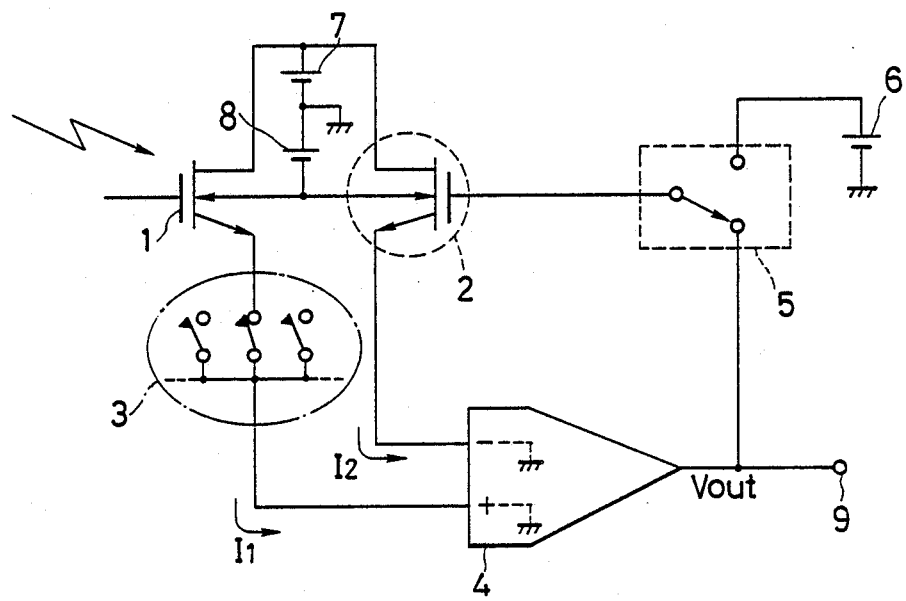
FIG. 4 shows the basic structure of a solid state imaging apparatus according to the present invention.

The present invention will be hereinunder described in detail with reference to FIG. 4 which schematically shows a solid state imaging apparatus that employs a charge modulation device as an internal amplification type light-receiving element. The apparatus includes light-receiving charge modulation devices 1 which are arranged in a line or a matrix, the light-receiving charge modulation devices being shown as one to simplify the description; a reference charge modulation device 2 which has the same structure as that of the light-receiving charge modulation device and from which light is blocked; a MOS type horizontal selection switch 3 connected to the source of the light-receiving charge modulation device 1; and an amplifier 4 to which a source current $I_1$ of the light-receiving charge modulation device 1 and a source current $I_2$ of the reference charge modulation device 2 are input, the source current $I_1$ being input through the selection switch 3, and whose output is input to the gate of the reference charge modulation device 2; a switch 5 for resetting the reference charge modulation device 2; a reset power source 6; and a drain power source 7 and a substrate power source 8 for the light-receiving charge modulation device 1 and the reference charge modulation device 2.

In the thus-arranged solid state imaging apparatus, when the light-receiving charge modulation device 1 is selected by the horizontal selection switch 3, the source current $I_1$ flows to the amplifier 4, which is an ideal differential transimpedance amplifier of the type to which a current is input and a voltage is output, and which has characteristics expressed by:

$$V_{OUT} = Z_T(I_1 - I_2) \qquad (6)$$

$$Z_T \to +\infty \qquad (7)$$

This causes $V_{OUT}$ to be output to the reference charge modulation device 2 which forms a negative feedback path, which has the same structure as that of the light-receiving charge modulation device 1, to which the same drain voltage and the substrate voltage as those applied to the light-receiving charge modulation device 1 are applied, and from which light is blocked, so as to enable the same source current $I_2$ as that in the light-receiving charge modulation device 1 to flow therethrough.

Figure 5:
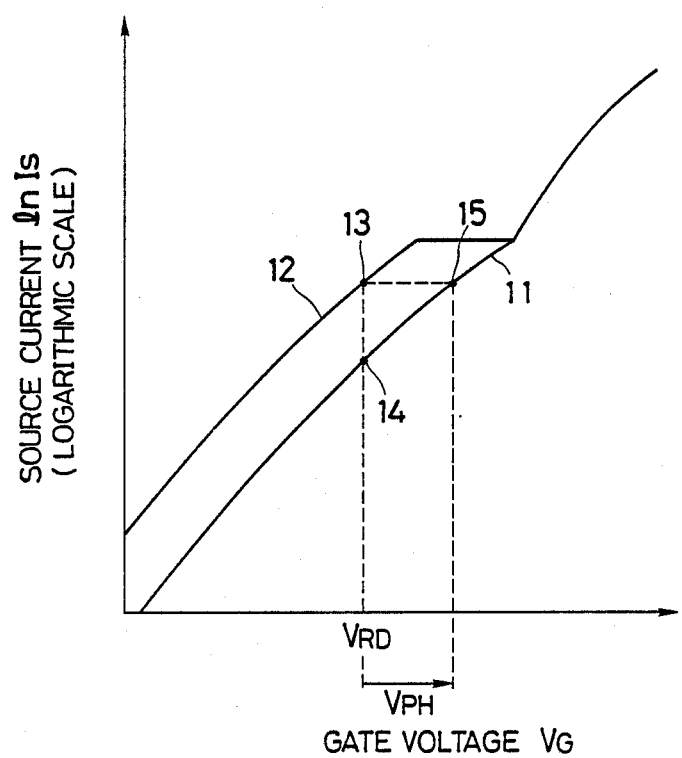
FIG. 5 shows the gate voltage-source current characteristics of a charge modulation device.

The significance of the output $V_{OUT}$ will now be explained with reference to FIG. 5 which shows the gate voltage ($V_G$)-source current ($lnI_S$) characteristics of the charge modulation device. In the graph, whereas the current-voltage characteristic of a dark charge modulation device is denoted by a curve 11, whereas that of a charge modulation device which is receiving light (the quantity of the light being constant) is designated by a curve 12. In the charge modulation device which is receiving light, N charges generated by the light accumulate in the interface between the insulating film and the channel layer which are disposed immediately below the gate electrode, increasing the surface potential in the interface of the channel layer which is located just below the gate electrode as compared in the case wherein no charges exist by an amount expressed by equation (8):

$$V_{PH} = \frac{N \cdot q}{C_{OX}} \qquad (8)$$

where $C_{OX}$ is the capacity of the gate insulating film, and q is the unit charge. Therefore, the characteristic 12 of the charge modulation device which received light is identical to that 11 of the dark charge modulation device, but is moved parallel to the gate voltage axis by an amount which corresponds to the variation $V_{PH}$ in the gate potential. This means that the same quantity of source current as obtained at an operating point 13 of the charge modulation device which is receiving light can be caused to flow to the charge modulation device which is shielded from light if the dark charge modulation device which is shielded from light is set such that an operating point 14 thereof which corresponds to the operating point 13 is changed to an operating point 15. Since the gate voltage which is required for this setting is the output $V_{OUT}$, the relationship:

$$V_{OUT} = V_{RD} + V_{PH} \qquad (9)$$

holds, where $V_{RD}$ is a read-out gate biasing voltage which is applied from outside and which is therefore known. Therefore, $V_{PH}$ can be obtained using the output $V_{OUT}$ as follows:

$$V_{PH} = V_{OUT} - V_{RD} \qquad (10)$$

Turning to FIG. 4 again, the remaining structure of the solid state imaging apparatus will be described below. Charges are caused to accumulate by dark current in the reference charge modulation device 2 as time elapses, causing errors in detecting $V_{PH}$. Therefore, the thus-accumulated charges must be discharged in the period during which the video signal is suspended, i.e., during every vertical retrace or horizontal retrace interval. This function is carried out by the reset switch 5 and the reset power source 6. More specifically, the reference charge modulation device 2 is separated from the feedback loop by switching over the reset switch 5 in each period during which the video signal is suspended so as to enable the reset voltage to be applied to the gate of the reference charge modulation device 2, thereby discharging the accumulated charges and eliminating detection errors. In addition, the differential transimpedance amplifier 4 should be of low input impedance type because the parasitic capacity which results from the use of a MOS type switch of the imaging apparatus is connected to the input thereof.

DETAILED DESCRIPTION OF THE PREFERRED EMBODIMENTS

Figure 6:
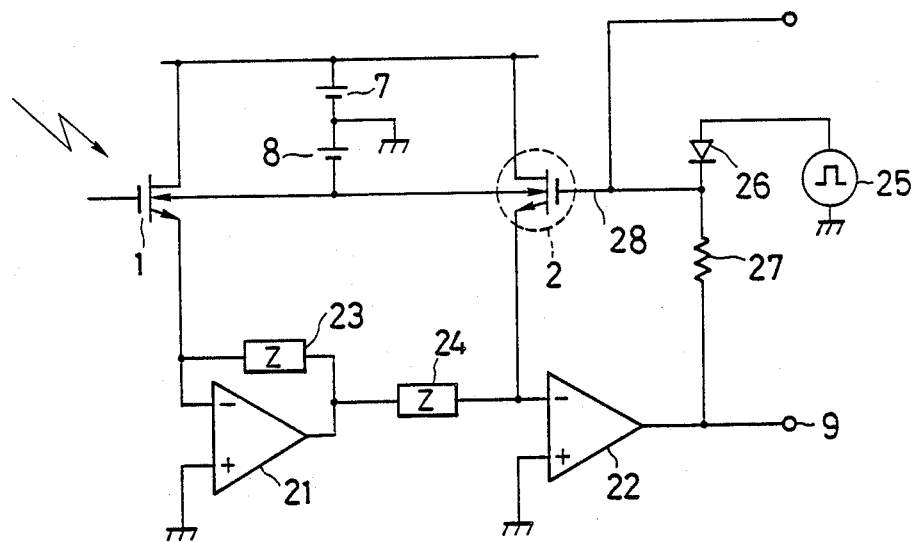
FIG. 6 is a circuit diagram of a first embodiment of the present invention.

Embodiments of the present invention will now be described. FIG. 6 is a circuit diagram of a first embodiment of a solid state imaging apparatus according to the present invention, in which the same reference numerals are used to denote the same parts as those of FIG. 4. In this embodiment, the source current from the light-receiving charge modulation device 1 is converted to a voltage by a differential operational amplifier 21 and a feedback impedance 23, and the converted output voltage is applied to one end of an impedance 24 having the same value as that of the feedback impedance 23. The other end of the impedance 24 is connected to an inverted input terminal of a differential operational amplifier 22 on which negative feedback is conducted by the reference charge modulation device 2.

With this arrangement, the voltage $V_{OUT}$ which ensures that the current which flows through the impedance 23 is equal to that which flows through the impedance 24, i.e., that ensures that the same quantity of current flows through the light-receiving element charge modulation device 1 and the reference charge modulation device 2, appears at an output terminal 9 or a gate terminal 28 of the reference charge modulation device 2. As a result, a voltage output which is proportional to the quantity of light which has been received can be obtained using this output voltage $V_{OUT}$ from equation (10), i.e., $V_{PH} = V_{OUT} - V_{RD}$.

The charges accumulated in the reference charge modulation device 2 by the dark current are reset by inputting to the gate terminal 28 thereof from a reset pulse generating circuit 25 through a switch composed of a switching diode 26 and a resistor 27 the pulses having a sufficiently large positive potential during resetting and a sufficiently negative potential, as compared with the gate read-out potential, at all other times.

Figure 7:
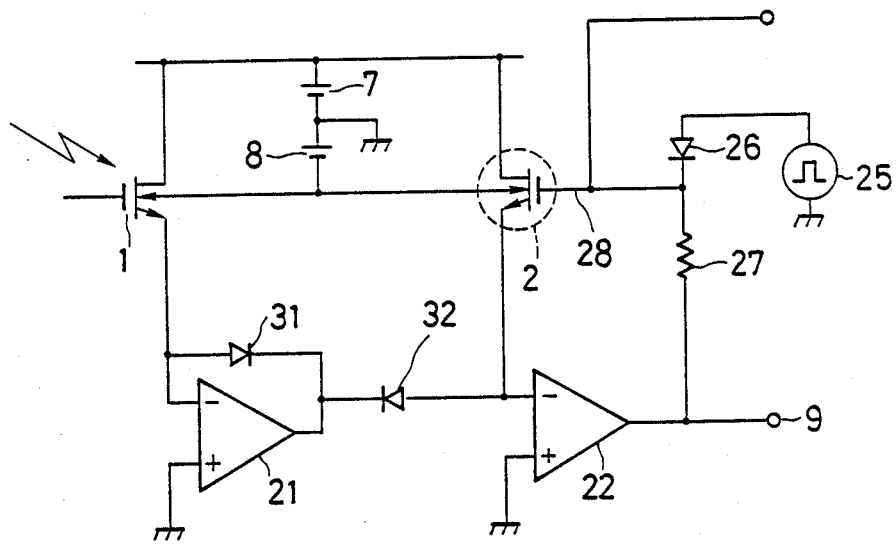
FIG. 7 is a circuit diagram of a second embodiment of the present invention.

FIG. 7 is a circuit diagram of a second embodiment of the present invention, in which the same reference numerals are used to designate the parts which have the same or equivalent functions as those of the parts of the first embodiment shown in FIG. 6. This embodiment uses diodes 31 and 32 in place of the linear feedback impedances 23 and 24 employed in the first embodiment shown in FIG. 6. This enables the source current of the light-receiving charge modulation device 1 to appear as a logarithmically compressed voltage at the output of the operational amplifier 21, enabling a reduction in the dynamic range required for the operational amplifier 21 when the γ value of the light-receiving charge modulation device 1 which is expressed by the equation 4 is larger than 1.

Figure 8:
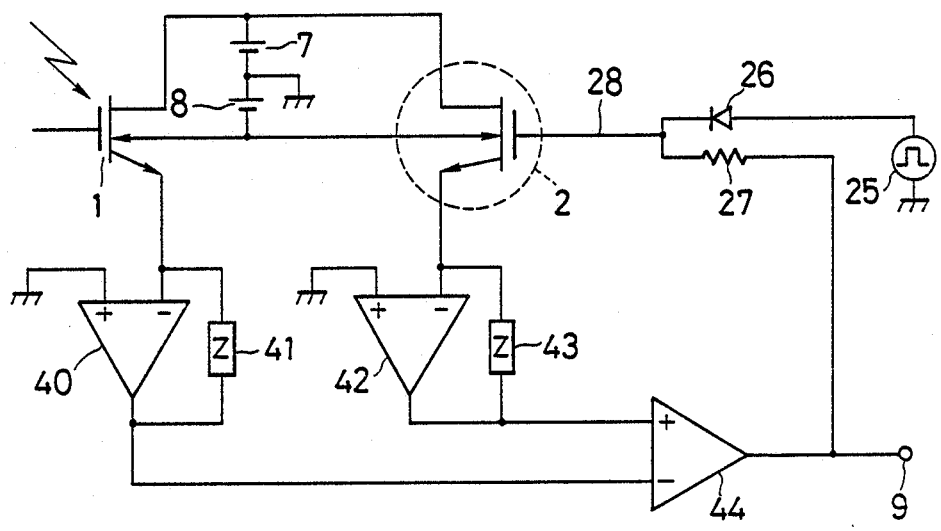
FIG. 8 is a circuit diagram of a third embodiment of the present invention.

FIG. 8 is a circuit diagram of a third embodiment of the present invention, in which the same reference numerals are used to denote the parts having the same or equivalent functions as those of the parts of the first and second embodiments shown in FIGS. 6 and 7. In the embodiments shown in FIGS. 6 and 7, since the two operational amplifiers 21 and 22 have the different feedback factors, the errors that may be caused by the offset and bias currents of the two amplifiers are different from each other, adversely affecting the output. In order to eliminate this problem, the present embodiment employs amplifiers each of which is composed of an operational amplifier 40 or 42 and a feedback impedance 41 or 43 and which are set at the same feedback factor for detecting the current of the light-receiving charge modulation device 1 and that of the reference charge modulation device 2, respectively. The outputs of the amplifiers are compared by an operational amplifier 44, and the output of the operational amplifier 44 is fed back to the gate terminal of the reference charge modulation device 2. Although the present embodiment employs the linear feedback impedances 41 and 43 to detect the currents, they may be replaced by the diodes, as in the embodiment shown in FIG. 7.

Figure 9:
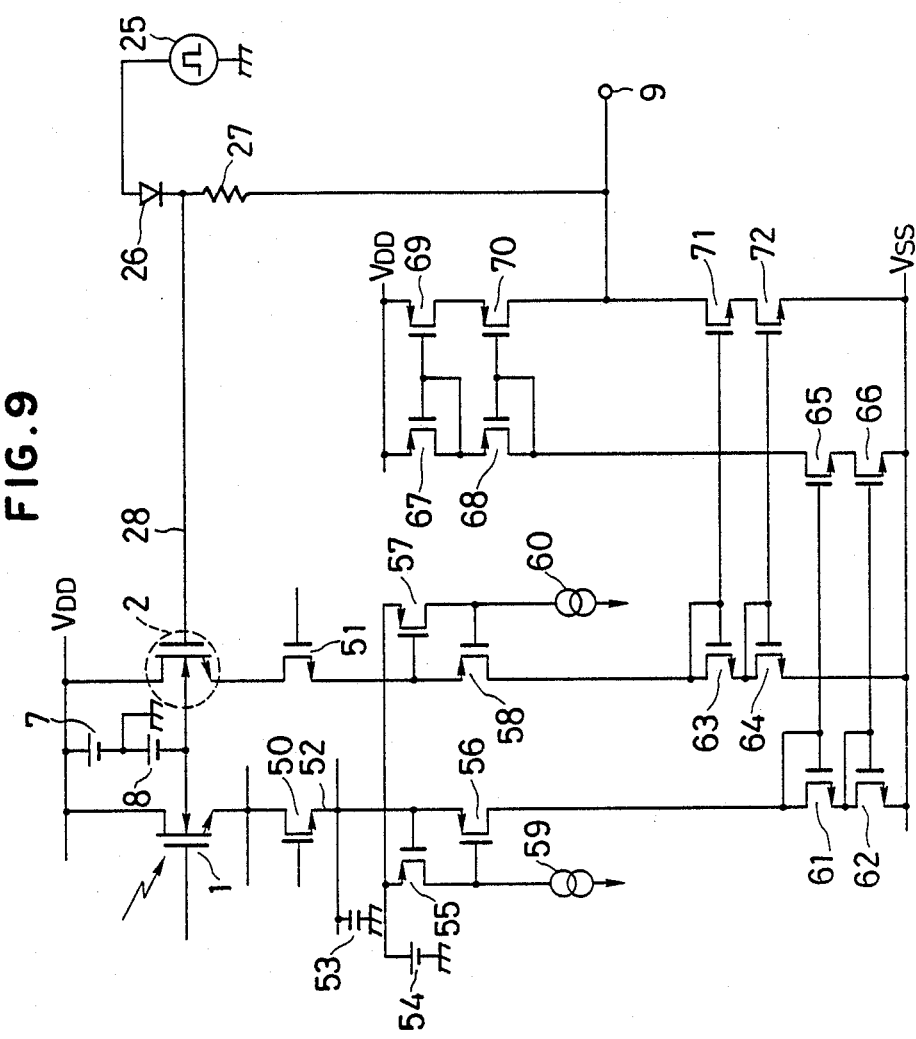
FIG. 9 is a circuit diagram of a fourth embodiment of the present invention.

FIG. 9 is a circuit diagram of a fourth embodiment of the present invention, in which the same reference numerals are used to denote the parts having the same or equivalent functions as those of the parts of the first to third embodiments shown in FIGS. 6 to 8. In the first to third embodiments, since the signal current of the light-receiving element is converted to a voltage by using differential voltage input type of operational amplifier, two or three operational amplifiers are required, making the circuitry a complicated one. However, as can be seen from the principle shown in FIG. 4, a differential current input type operational amplifier may also be used to achieve the object of the present invention. Use of such a differential current input type operational amplifier enables the structure of a circuit to be simplified. This embodiment materializes utilization of the differential current input type operation amplifier.

More specifically, the source currents of the light-receiving charge modulation device 1 and the reference charge modulation device 2 are respectively input through low impedance current input circuits each of which is composed of P channel MOS transistors 55 and 56 or 57 and 58, and are output through transconductance gain stages composed of MOS transistors 61, 62, 63, 64, 65, 66, 67, 68, 69, 70, 71, and 72. In this embodiment, since the load of the output consists of only the gate of the reference charge modulation device 2, the speed of response of the system can be increased. In the circuitry shown in FIG. 9, reference numerals 50 and 51 denote a MOS type switch; 52 denotes a video line; 53 denotes a parasitic capacity; 54 denotes a power source; and 59 and 60 denote constant-current sources.

In the above-described embodiments 1 to 4, the charge accumulated in the reference charge modulation device by the dark current is reset by switching over the gate terminal of the reference charge modulation device and then applying a reset pulse. This means that the reference charge modulation device is separated from the feedback loop during resetting, causing a problem from the viewpoint of the response speed of the amplifier.

Figure 10:
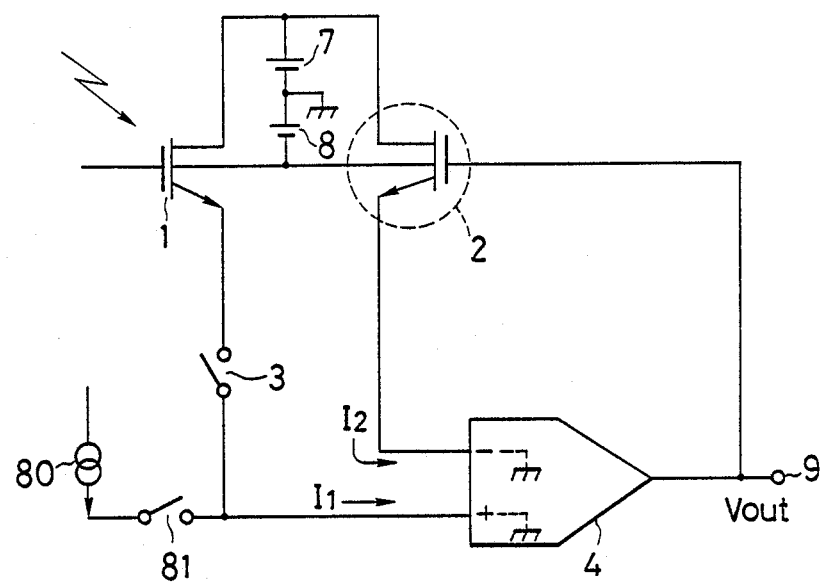

Means for resetting the reference charge modulaton device without separating it from the feedback loop even during the resetting will be now described with reference to FIG. 10 which shows the principle on which the operation of such means is based on, and in which the same reference numerals are used to denote the parts having the same or equivalent functions as those of the parts shown in FIG. 4. As has been stated, the normal output signal appears at the output terminal 9 in a state wherein the MOS type selection switch 3 of the charge modulation device type imaging apparatus is closed and wherein a switch 81 is open. When the reference charge modulation device 2 is to be reset, the selection switch 3 is turned off so as to enable the light-receiving charge modulation device 1 to be separated from the amplifier system. At this time, if the switch 81 is turned on so as to allow the current of a current source 80 which ensures that the reference charge modulation device 2 operates in a surface channel mode to be input to the differential type transimpedance amplifier 4, a positive gate voltage which ensures that the reference charge modulation device 2 operates in the surface channel mode is generated at the output terminal 9 by means of the negative feedback of the signal outputting circuit, thereby resetting the charge accumulated in the reference charge modulation device 2 by the dark current.

Figure 11:
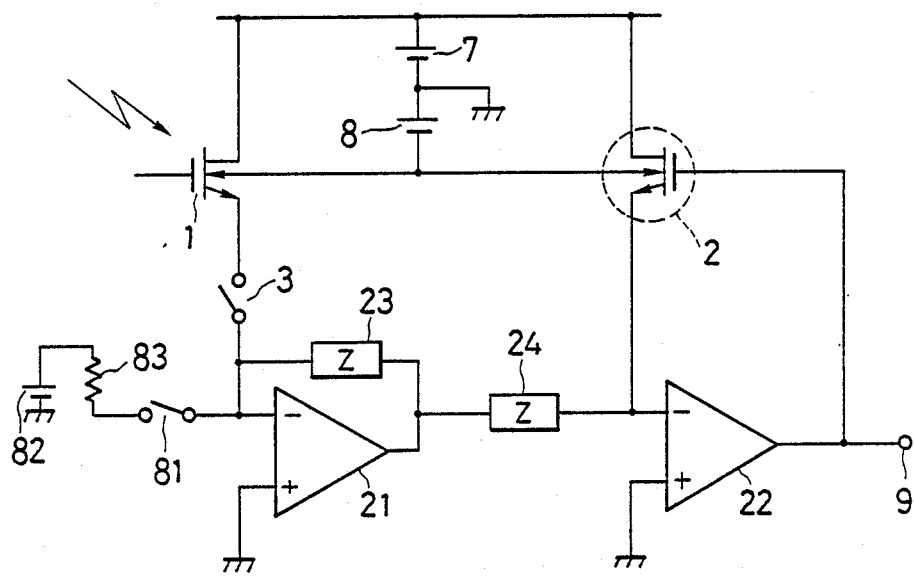
FIG. 11 is a circuit diagram of a fifth embodiment of the present invention.

FIG. 11 shows a fifth embodiment of the present invention to which the above-described principle is applied. In the drawing, the same reference numerals are used to designate the parts which have the same or equivalent functions as those of the parts shown in FIG. 10 and in the first embodiment shown in FIG. 6. In this embodiment, the signal is read out in the same manner as that of the first embodiment while the selection switch 3 is on and the switch 81 is off. On the other hand, while the reference charge modulation device 2 is being reset, the selection switch 3 is off and the switch 81 is on, so that a current having the same value as that set by a power source 82 and a resistor 83 flows to the reference charge modulation device 2. Therefore, if the current value is set by the power source 82 and the resistor 83 such that it ensures enough gate terminal reset voltage to discharge the charges accumulated by the dark current, the reference charge modulation device 2 can be reset without separating the feedback system.

Figure 12:
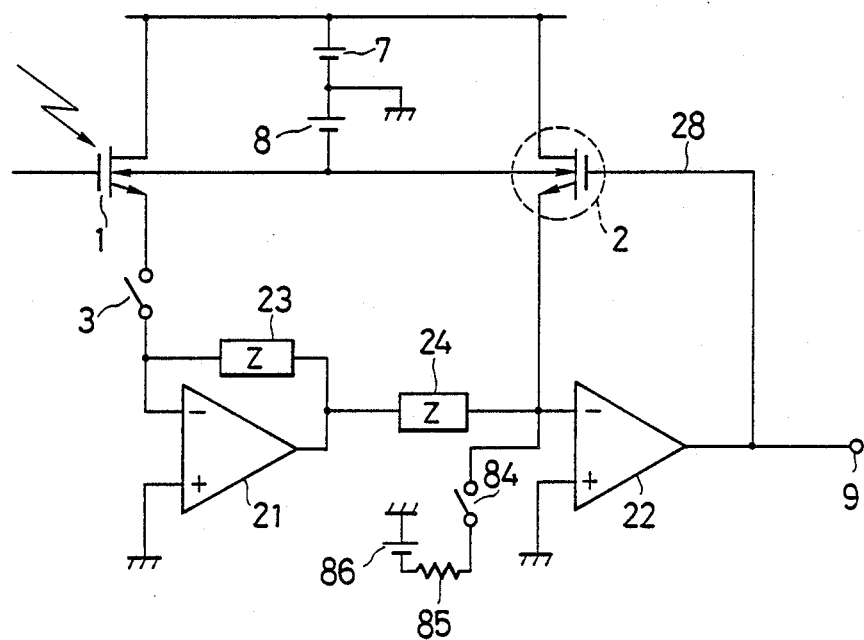
FIG. 12 is a circuit diagram of a sixth embodiment of the present invention.

FIG. 12 is a circuit diagram of a sixth embodiment of the present invention, in which the same reference numerals are used to denote parts having the same or equivalent functions as those of the parts in the embodiment shown in FIG. 11. In the fifth embodiment shown in FIG. 11, another current is fed to the terminal of the operational amplifier 21 to which the source current of the light-receiving charge modulation device 1 is input during resetting of the reference charge modulation device 2 so as to reset the reference charge modulation device 2. On the other hand, in this embodiment, a current is drawn out by a switch 84, a resistor 85, and a power source 86 from the terminal to which the current from the reference charge modulation device 2 is input during resetting so as to reset the reference charge modulation device 2.

Figure 13:
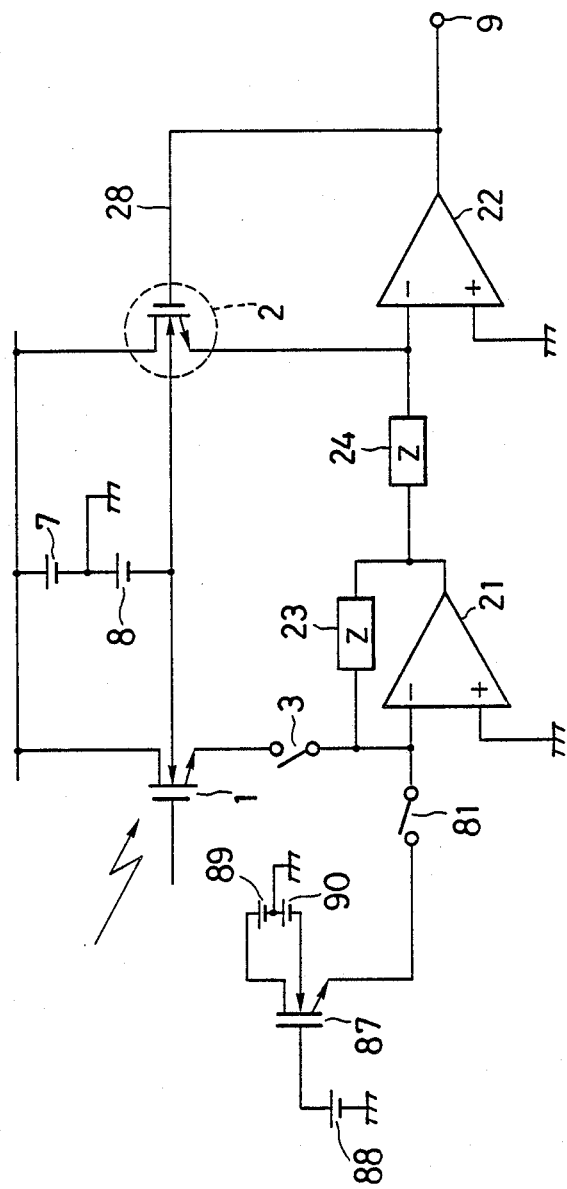
FIG. 13 is a circuit diagram of a seventh embodiment of the present invention.

FIG. 13 is a circuit diagram of a seventh embodiment of the present invention, in which the same reference numerals are used to denote the parts having the same or equivalent functions as those of the fifth embodiment shown in FIG. 11. This embodiment includes a resetting charge modulation device 87 to which drain and substrate voltages are applied by power sources 89 and 90, to which a resetting voltage is applied by a power source 88, and whose source current is input through the switch 81 to the input terminal of the operational amplifier 21 to which the source current of the light-receiving charge modulation device 1 is input, during resetting of the reference charge modulation device 2. At this time, if the voltages of the drain and substrate power sources 89 and 90 for the resetting charge modulation device 87 are set to the same values as those of the drain and substrate power sources 7 and 8 for the light-receiving charge modulation device 1, a voltage having the same value as that of the gate voltage of the resetting charge modulation device 87 applied by the power source 88 can be applied to a gate terminal 28 of the reference charge modulation device 2 so as to ensure accurate resetting operation.

The above-described fifth to seventh embodiments involve application of the means for resetting the reference charge modulation device without separating the feedback group to the first embodiment shown in FIG. 6. However, it is clear that such resetting means can also be applied to each of the embodiments shown in FIGS. 7, 8, and 9.

Figure 14:
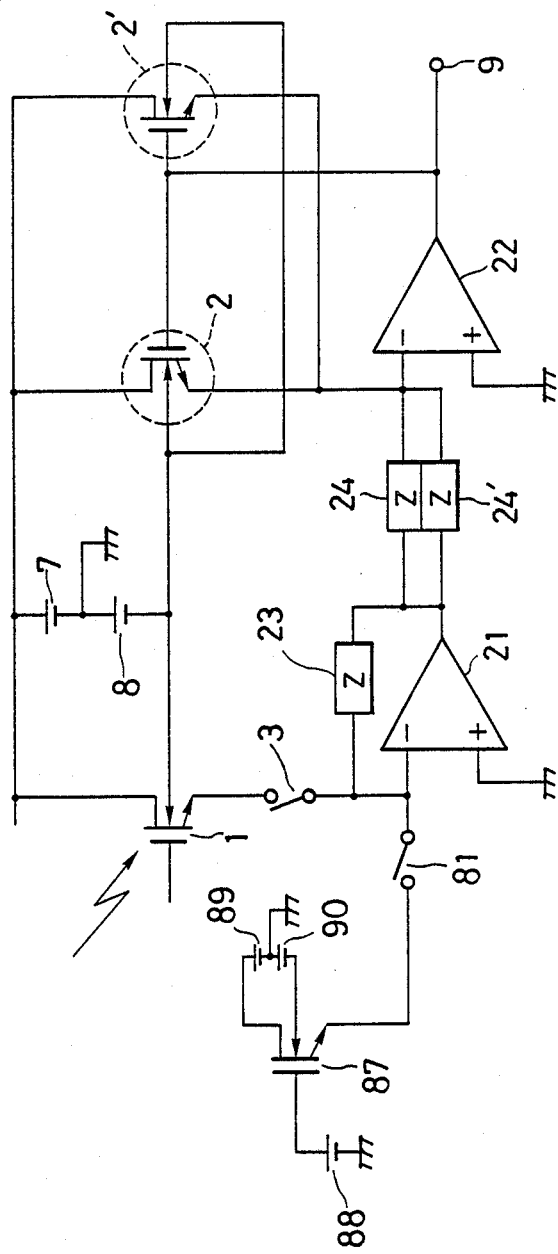
FIG. 14 is a circuit diagram of an eighth embodiment of the present invention.

FIG. 14 is a circuit diagram of an eighth embodiment of the present invention, in which the same reference numerals are used to denote the parts having the same or equivalent functions as those of the parts of the seventh embodiment shown in FIG. 13. This embodiment differs from the embodiment shown in FIG. 13 in that it includes two parallel-connected reference charge modulation devices 2 and 2' and two parallel-connected impedances 24 and 24'. The impedances 24 and 24' serve as impedances for detecting the currents of the reference charge modulation devices 2 and 2'. The output voltage $V_{OUT}$ is obtained at the output terminal 9, as in any of the previously-described embodiments. In this embodiment, the source current value is doubled by the operation of the two parallel-connected reference charge modulation devices 2 and 2', and the doubled source current value is multiplied by a coefficient of $\frac{1}{2}$ when it is compared with the current of the light-receiving charge modulation device, so as to ensure the same operation as that of any of the aforementioned embodiments. In this way, dispersions caused by the structural parameters of the reference charge modulation devices 2 and 2' can be compressed to $1/\sqrt{2}$, reducing the signal errors caused by dispersions in the characteristics of the reference charge modulation device when compared to any of the aforementioned embodiments.

In this embodiment, two parallel-connected reference charge modulation devices are incorporated. However, the number is not limited to two but N parallel-connected reference charge modulation devices may be included. This embodiment is based on the embodiment shown in FIG. 13. However, incorporation of parallel-connected reference charge modulation devices may also be applied to any of the embodiments shown in FIGS. 6 to 12.

Any of the above-described embodiments employs a charge modulation device as an internal amplification type of light-receiving element. However, the essential part of the present invention lies in the fact that, in the internal amplification type light receiving element of the type in which changes in the quantity of light which is received causes variations in the effective gate potential and these variations are detected as variations in the channel current, the variations in the gate potential which are caused by the changes in the quantity of light which is received are detected by inversely converting the channel current to the gate voltage by the feedback loop having the same structure as that of the internal amplification type light-receiving element. Therefore, application of the present invention is not limited to a solid state imaging apparatus which employ a charge modulation device as an internal amplification type element, but the present invention can be applied to a solid state imaging apparatus employing static induction transistors or gate controlled MOS array which are known as similar internal amplification type light-receiving elements. The gate controlled MOS array which is also called an amplified MOS imager is introduced from page 1075 to page 1082 in Television Society Journal Vol. 41, No. 11 issued in 1987.

As will be understood from the foregoing description, solid state imaging apparatus according to the present invention uses a signal read-out circuit provided with a feedback loop incorporating a reference internal amplification type light-receiving element which is shielded from light illumination, and is therefore capable of producing an output which corresponds to variations in the potential which are substantially linear to the quantity of light which is received. Further, since the source current is inversely converted to the gate voltage using the element having the same structure, temperature characteristics in the output caused by variations in the channel current with respect to variations in the gate potential of an element can be compensated for.

What is claimed is:

1. A solid state imaging apparatus comprising:
   an internal amplification type of light-receiving element which constitutes a picture element;
   a signal processing circuit incorporating a pre-amplifier for processing a video signal current of said light-receiving element constituting the picture element;
   an internal amplification type reference light-receiving element which is shielded from light;
   a feedback loop provided in said pre-amplifier for controlling the gate voltage of said reference light-receiving element such that a current having the same value as that of the video signal current of said light-receiving element which constitutes the picture element is caused to flow to said reference light-receiving element; and
   means for discharging the dark current charge accumulated in said reference light-receiving element in the period during which the video signal current from said light-receiving element constituting the picture element is suspended.

2. A solid state imaging apparatus according to claim 1, wherein said reference light-receiving element is composed of a plurality of parallel-connected light-receiving elements, and said feedback loop of said pre-amplifier is adapted to control the gate voltage of each of said reference light-receiving elements such that a current which bears a fixed proportional relationship with the video signal current of said light-receiving element constituting a picture element is caused to flow to said plurality of reference light-receiving elements.

3. A solid state imaging apparatus according to claim 1, wherein said pre-amplifier is a differential type transimpedance amplifier to which the video signal current from said light-receiving element constituting a picture element and an output current of said reference light-receiving element whose gate voltage is controlled by the voltage output from said amplifier are both input.

4. A solid state imaging apparatus according to claim 1, wherein said means for discharging the dark current charge is comprised of means for applying bias to the gate terminal of said reference light-receiving element.

5. A solid state imaging apparatus according to claim 2, wherein said means for discharging the dark current charge is comprised of means for applying bias to the gate terminal of said reference light-receiving element.

6. A solid state imaging apparatus according to claim 3, wherein said means for discharging the dark current charge is comprised of means for applying bias to the gate terminal of said reference light-receiving element.

7. A solid state imaging apparatus according to claim 1, wherein said means for discharging the dark current charge is comprised of means for supplying a current having the same value as that of the current required to reset said reference light-receiving element to the terminal of said pre-amplifier to which the video signal current is input.

8. A solid state imaging apparatus according to claim 2, wherein said means for discharging the dark current charge is comprised of means for supplying a current having the same value as that of the current required to reset said reference light-receiving element to the terminal of said pre-amplifier to which the video signal current is input.

9. A solid state imaging apparatus according to claim 3, wherein said means for discharging the dark current charge is comprised of means for supplying a current having the same value as that of the current required to reset said reference light-receiving element to the terminal of said pre-amplifier to which the video signal current is input.

10. A solid state imaging apparatus according to claim 1, wherein said means for discharging the dark current charge is comprised of means for extracting a current required to reset said reference light-receiving element from the terminal of said pre-amplifier to which the current from said reference light-receiving element is input.

11. A solid state imaging apparatus according to claim 2, wherein said means for discharging the dark current charge is comprised of means for extracting a current required to reset said reference light-receiving element from the terminal of said pre-amplifier to which the current from said reference light-receiving element is input.

12. A solid state imaging apparatus according to claim 3, wherein said means for discharging the dark current charge is comprised of means for extracting a current required to reset said reference light-receiving element from the terminal of said pre-amplifier to which the current from said reference light-receiving element is input.

13. A solid state imaging apparatus comprising:
an internal amplification type of light-receiving element which constitutes a picture element;
a first differential operational amplifier incorporating a feedback impedance for converting the video signal current of said light-receiving element constituting a picture element to a voltage;
a second differential operational amplifier having an inverted input terminal to which the output of said first differential operational amplifier is input through an impedance having the same value as that of said feedback impedance;
an internal amplification type reference light-receiving element which is shielded from light illumination and whose gate voltage is controlled by the output voltage of said second differential operational amplifier;
a feedback loop of said second differential operational amplifier through which the output current of said reference light-receiving element is input to said inverted input terminal; and
means for discharging the dark current charge accumulated in said reference light-receiving element in the period during which the video signal current from said light-receiving element constituting a picture element is suspended.

14. A solid state imaging apparatus according to claim 13, wherein said means for discharging dark current charge is comprised of means for applying bias to the gate terminal of said reference light-receiving element.

15. A solid state imaging apparatus according to claim 13, wherein said means for discharging dark current charge is comprised of means for supplying a current having the same value as that of the current required to reset said reference light-receiving element to the terminal of said first differential operational amplifier to which the video signal current is input.

16. A solid state imaging apparatus according to claim 15, wherein said means for supplying the current is comprised of a power source and a resistor, and is connected through a switch to said video signal current inputting terminal of said first differential operational amplifier during resetting of said reference light-receiving element.

17. A solid state imaging apparatus according to claim 15, wherein said means for supplying the current is comprised of an internal amplification type of resetting light-receiving element having a gate electrode to which a resetting voltage is applied, and the output current of said resetting light-receiving element is input through a switch to the video signal current inputting terminal of said first differential operational amplifier when said reference light-receiving element is to be reset.

18. A solid state imaging apparatus according to claim 13, wherein said means for discharging dark current charge is comprised of means for extracting a current required to reset said reference light-receiving element from the inverted input terminal of said second differential operational amplifier.

19. A solid state imaging apparatus comprising:
an internal amplification type of light-receiving element which constitutes a picture element;
a first differential operational amplifier incorporating a feedback diode for converting the video signal current of said light-receiving element constituting a picture element to a voltage;
a second differential operational amplifier having an inverted input terminal to which the output of said first differential operational amplifier is input through a diode having the same characteristics as those of said feedback diode;
an internal amplification type of reference light-receiving element which is shielded from light illumination and whose gate voltage is controlled by the output voltage of said second differential operational amplifier;

a feedback loop of said second differential operational amplifier through which the output current of said reference light-receiving element is input to said inverted input terminal; and means for discharging the dark current charge accumulated in said reference light-receiving element in the period during which the video signal current from said light-receiving element constituting a picture element is suspended.

20. A solid state imaging apparatus comprising:

an internal amplification type of light-receiving element which constitutes a picture element;

an internal amplification type of reference light-receiving element which is shielded from light illumination;

a first differential operational amplifier for converting the video signal current of said light-receiving element constituting a picture element to a voltage;

a second differential operational amplifier for converting the output current of said reference light-receiving element to a voltage, said second differential operational amplifier having the same feedback factor as that of said first differential operational amplifier;

a third differential operational amplifier for comparing the outputs of said first and second differential operational amplifiers;

a feedback loop to which the output voltage of said third differential operational amplifier is input so as to enable the gate voltage of said reference light-receiving element to be controlled; and means for discharging the dark current charge accumulated in said reference light-receiving element in the period during which the video signal current from said light-receiving element constituting a picture element is suspended.

21. A solid state imaging apparatus comprising:

an internal amplification type of light-receiving element which constitutes a picture element;

an internal amplification type of reference light-receiving element which is shielded from light illumination;

a current input type differential operational amplifier to which the output currents of said light-receiving element constituting a picture element and said reference light-receiving element are input through respective low impedance current inputting circuits;

a feedback loop to which the output voltage of said differential operational amplifier is input so as to enable the gate voltage of said reference light-receiving element to be controlled; and means for discharging the dark current charge accumulated in said reference light-receiving element in the period during which the video signal current from said light-receiving element constituting a picture element is suspended.

* * * * *